US009556932B2

(12) United States Patent
Asano

(10) Patent No.: US 9,556,932 B2
(45) Date of Patent: Jan. 31, 2017

(54) REDUCTION GEAR

(71) Applicant: Sumitomo Heavy Industries, Ltd., Tokyo (JP)

(72) Inventor: Kyoshi Asano, Aichi (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 19 days.

(21) Appl. No.: 14/486,496

(22) Filed: Sep. 15, 2014

(65) Prior Publication Data
US 2015/0101435 A1 Apr. 16, 2015

(30) Foreign Application Priority Data

Oct. 10, 2013 (JP) .................................. 2013-213173
Jan. 10, 2014 (JP) .................................. 2014-003797

(51) Int. Cl.
| | |
|---|---|
| F16H 57/02 | (2012.01) |
| F16H 1/12 | (2006.01) |
| F16H 1/14 | (2006.01) |
| F16H 57/025 | (2012.01) |
| F16H 1/28 | (2006.01) |

(52) U.S. Cl.
CPC ......... *F16H 1/12* (2013.01); *F16H 1/14* (2013.01); *F16H 57/02* (2013.01); *F16H 57/025* (2013.01); *F16H 1/28* (2013.01); *Y10T 74/1966* (2015.01)

(58) Field of Classification Search
CPC ............... F16H 1/14; F16H 1/12; F16H 57/02
USPC .................................................. 74/416, 417
See application file for complete search history.

(56) References Cited

U.S. PATENT DOCUMENTS

| | | | | |
|---|---|---|---|---|
| 4,034,621 A | * | 7/1977 | Ritter, Jr. .................. | F16H 1/14 74/417 |
| 4,488,729 A | * | 12/1984 | Story ........................ | E21B 3/02 277/408 |
| 4,527,443 A | * | 7/1985 | Ohoka ...................... | F16H 1/14 74/417 |
| 5,065,639 A | * | 11/1991 | Flanhardt ............. | A01B 71/066 74/417 |
| 6,364,803 B1 | * | 4/2002 | Barnholt ................. | F16C 23/10 475/230 |
| 2005/0066757 A1 | * | 3/2005 | Chu .......................... | F16H 1/14 74/424 |

(Continued)

FOREIGN PATENT DOCUMENTS

JP 4887291 B2 2/2012

*Primary Examiner* — William Kelleher
*Assistant Examiner* — Gregory Prather
(74) *Attorney, Agent, or Firm* — Michael Best and Friedrich LLP

(57) ABSTRACT

A reduction gear includes: an orthogonal shaft reduction gear having an orthogonal shaft reduction gear casing; and a parallel shaft reduction gear having a parallel shaft reduction gear casing, which is connected to the orthogonal shaft reduction gear, wherein the orthogonal shaft reduction gear casing and the parallel shaft reduction gear casing are connected through a joint plate, the orthogonal shaft reduction gear casing has a flange portion protruding to the outside of the orthogonal shaft reduction gear casing, and the orthogonal shaft reduction gear casing and the joint plate are connected by a first bolt inserted into the flange portion from the orthogonal shaft reduction gear side, and a second bolt inserted into the joint plate from the parallel shaft reduction gear side.

11 Claims, 4 Drawing Sheets

(56) References Cited

U.S. PATENT DOCUMENTS

2012/0011954 A1* 1/2012 Adkins ................ B23B 45/003
  74/417

* cited by examiner

REDUCTION GEAR

RELATED APPLICATION

Priority is claimed to Japanese Patent Application No. 2013-213173, filed Oct. 10, 2013, and Japanese Patent Application No. 2014-003797, filed Jan. 10, 2014, the entire content of each of which is incorporated herein by reference.

BACKGROUND

Technical Field

The present invention relates to a reduction gear.

Description of Related Art

The related art discloses a reduction gear in which an orthogonal shaft reduction gear having an orthogonal shaft reduction gear casing and a parallel shaft reduction gear having a parallel shaft reduction gear casing are connected.

The orthogonal shaft reduction gear is provided with an orthogonal pinion shaft which is supported on the orthogonal shaft reduction gear casing through a bearing. The orthogonal shaft reduction gear casing and the parallel shaft reduction gear casing are connected to face each other in a direction orthogonal to the orthogonal pinion shaft.

SUMMARY

According to an embodiment of the present invention, there is provided a reduction gear including: an orthogonal shaft reduction gear having an orthogonal shaft reduction gear casing; and a parallel shaft reduction gear having a parallel shaft reduction gear casing, which is connected to the orthogonal shaft reduction gear, wherein the orthogonal shaft reduction gear casing and the parallel shaft reduction gear casing are connected through a joint plate, the orthogonal shaft reduction gear casing has a flange portion protruding to the outside of the orthogonal shaft reduction gear casing, and the orthogonal shaft reduction gear casing and the joint plate are connected by a first bolt inserted into the flange portion from the orthogonal shaft reduction gear side, and a second bolt inserted into the joint plate from the parallel shaft reduction gear side.

DETAILED DESCRIPTION

In the reduction gear disclosed in the related art, in connection of the orthogonal shaft reduction gear casing and the parallel shaft reduction gear casing, it is necessary to perform bolt fastening work inside the orthogonal shaft reduction gear casing, and thus there is a problem in that assembling workability is poor.

It is desirable to provide a reduction gear which is provided with an orthogonal shaft reduction gear and a parallel shaft reduction gear and has good assembling workability.

According to an embodiment of the present invention, the orthogonal shaft reduction gear casing has the flange portion protruding to the outside of the orthogonal shaft reduction gear casing. Then, the orthogonal shaft reduction gear casing and the joint plate are connected by the first bolt inserted into the flange portion from the orthogonal shaft reduction gear side, and the second bolt inserted into the joint plate from the parallel shaft reduction gear side.

In this way, bolt fastening work between the orthogonal shaft reduction gear casing and the joint plate can be performed outside a casing, and therefore, assembling workability is improved.

Hereinafter, a reduction gear according to an example of an embodiment of the present invention will be described in detail based on the drawings.

Figure 1:
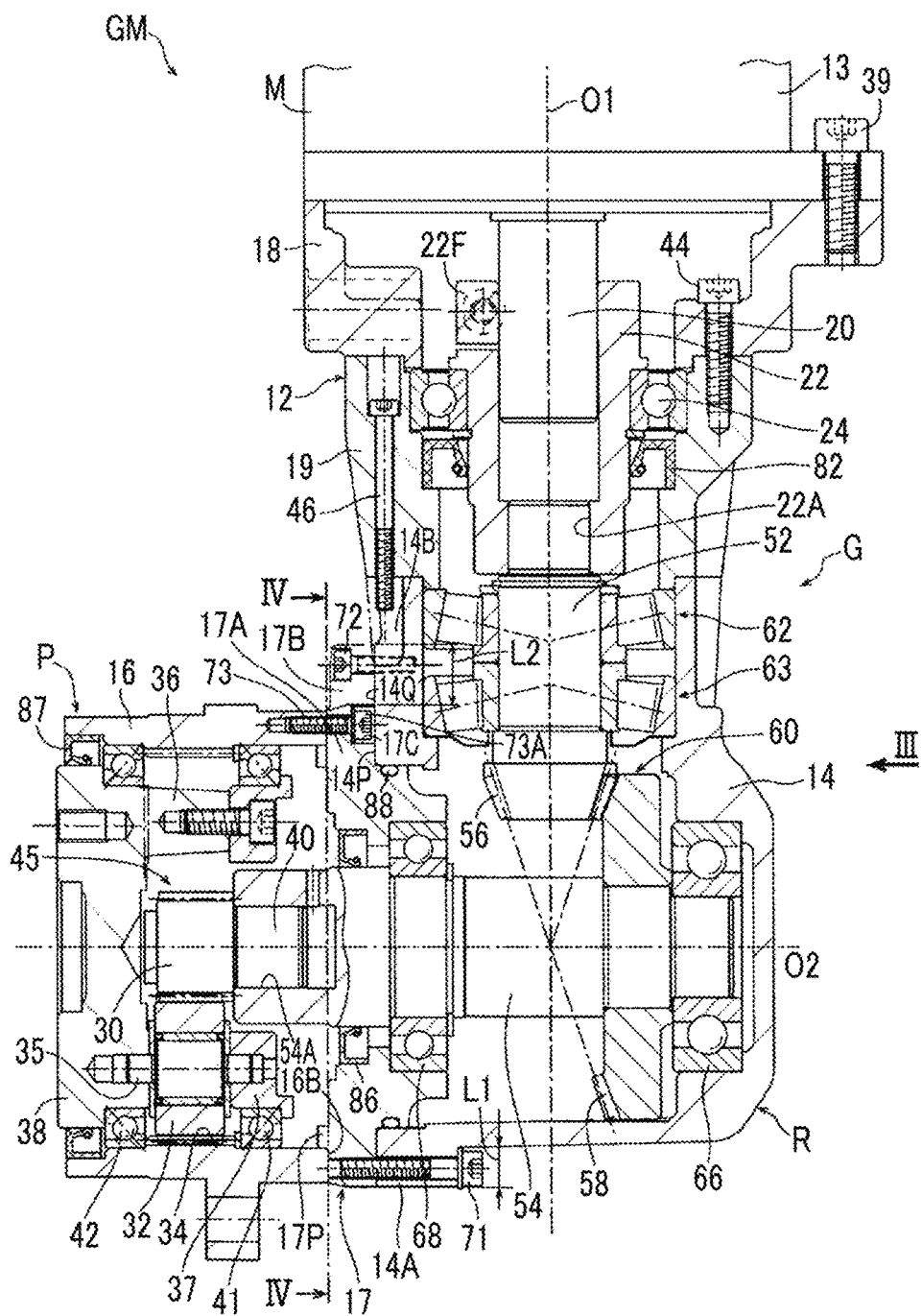
FIG. 1 is a cross-sectional front view showing a configuration example of a driving device which includes a reduction gear according to an example of an embodiment of the present invention.
Figure 2:
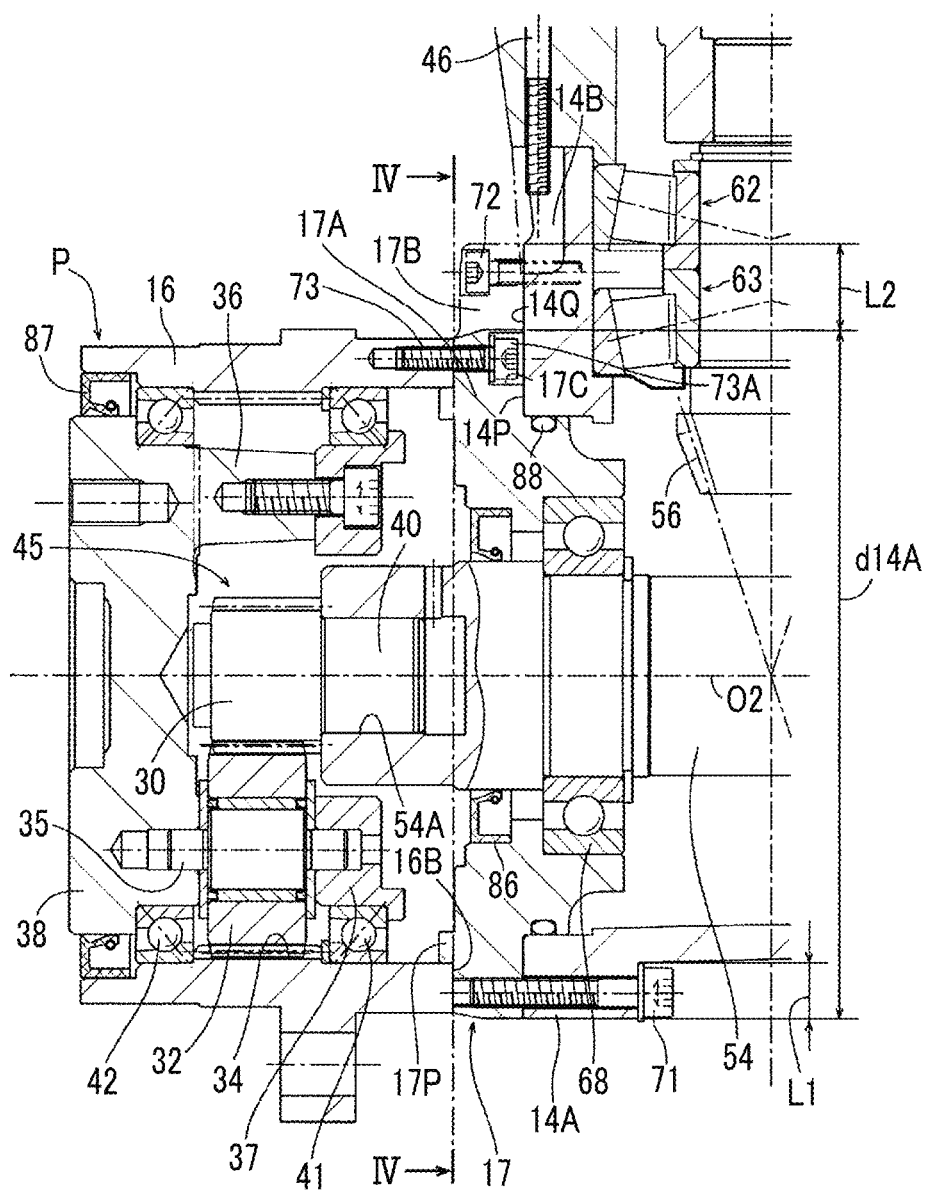
FIG. 2 is an enlarged view of a main section of FIG. 1.
Figure 3:
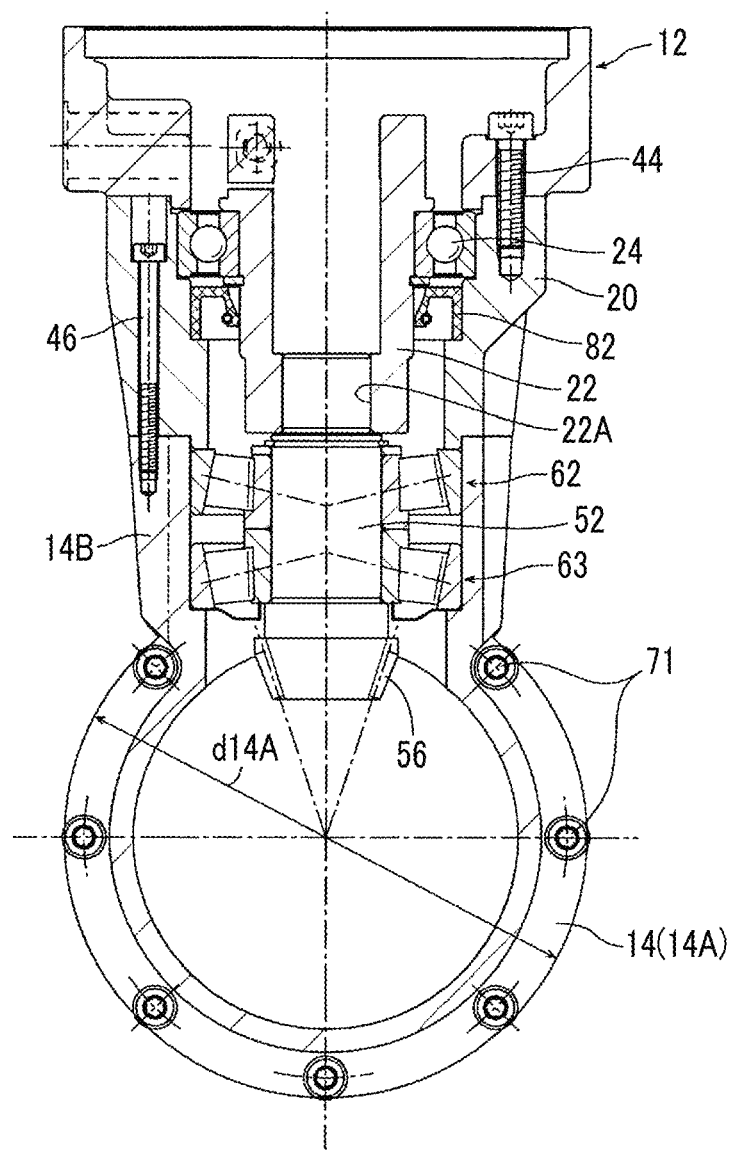
FIG. 3 is a partially cut-away side view when the reduction gear of FIG. 1 is viewed from a direction of arrow III.

FIG. 1 is a cross-sectional front view showing a configuration example of a driving device GM which includes a reduction gear G according to an example of an embodiment of the present invention, FIG. 2 is an enlarged view of a main section of FIG. 1, and FIG. 3 is a partially cut-away side view when the reduction gear G of FIG. 1 is viewed from a direction of arrow III of FIG. 1.

The driving device GM is a device configured by connecting a motor M and the reduction gear G through a joint unit 12. The reduction gear G is provided with an orthogonal shaft reduction gear R and a parallel shaft reduction gear P. The orthogonal shaft reduction gear R has an orthogonal shaft reduction gear casing 14 and the parallel shaft reduction gear P has a parallel shaft reduction gear casing 16. The orthogonal shaft reduction gear casing 14 is connected to the parallel shaft reduction gear casing 16 through a joint plate 17.

Hereinafter, a more specific configuration will be described.

The joint unit 12 connecting the motor M and the reduction gear G has a first joint casing 18 and a second joint casing 19. The first joint casing 18 is connected to a motor casing 13 through a bolt 39. The second joint casing 19 is connected to the orthogonal shaft reduction gear casing 14 through a bolt 46. The first joint casing 18 and the second joint casing 19 are connected through a bolt 44.

A joint shaft 22 is rotatably supported on the second joint casing 19 through a bearing 24. A portion of a motor shaft 20 of the motor M is inserted into one end side of the joint shaft 22. The motor shaft 20 is connected to the joint shaft 22 through a friction clamping device 22F. A hollow portion 22A is formed on the other end side of the joint shaft 22, and a portion of an input shaft (an orthogonal pinion shaft) 52 of the orthogonal shaft reduction gear R is press-fitted into the hollow portion 22A, whereby the joint shaft 22 and the input shaft 52 are connected. In addition, a method of connecting the joint shaft 22 and the input shaft 52 is not limited to press fitting.

The orthogonal shaft reduction gear R of the driving device GM is a reduction gear in which the input shaft 52 having a shaft center O1 and an output shaft 54 having a shaft center O2 are disposed orthogonally. In this example, the orthogonal shaft reduction gear R is provided with a bevel gear set 60 composed of a bevel pinion 56 formed on the input shaft 52 and a bevel gear 58 press-fitted onto the output shaft 54.

The input shaft 52 of the orthogonal shaft reduction gear R is press-fitted into the hollow portion 22A of the joint shaft 22 of the joint unit 12, as described above, thereby being connected to the joint shaft 22. The input shaft 52 is supported on the orthogonal shaft reduction gear casing 14 through a pair of tapered roller bearings (bearings supporting the orthogonal pinion shaft) 62 and 63. The tapered roller bearings 62 and 63 have a function of being capable of receiving thrust forces in both directions which are applied to the input shaft 52.

The output shaft 54 of the orthogonal shaft reduction gear R is supported on the orthogonal shaft reduction gear casing 14 through a ball bearing 66 and is also supported on the joint plate 17 which is connected to the orthogonal shaft reduction gear casing 14, through a ball bearing 68. A hollow portion 54A is formed in a leading end of the output shaft 54 and an input shaft 40 of the parallel shaft reduction gear P is press-fitted into the hollow portion 54A. In this way, the output shaft 54 of the orthogonal shaft reduction gear R and the input shaft 40 of the parallel shaft reduction gear P are connected. In addition, a method of connecting the output shaft 54 of the orthogonal shaft reduction gear R and the input shaft 40 of the parallel shaft reduction gear P is also not limited to press fitting.

Figure 4:
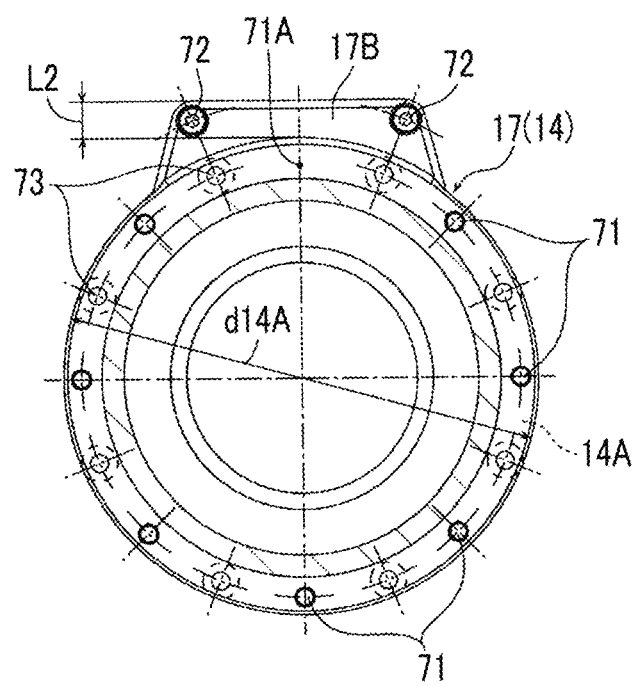
FIG. 4 is a cross-sectional view taken along line IV-IV of FIG. 1 and viewed in a direction of an arrow.

Here, a configuration of connecting the orthogonal shaft reduction gear R and the parallel shaft reduction gear P will be described in detail referring to FIGS. 3 and 4 together.

The orthogonal shaft reduction gear R and the parallel shaft reduction gear P in the driving device GM are connected through the joint plate 17. The orthogonal shaft reduction gear casing 14 has a flange portion 14A protruding to the outside in a radial direction of the orthogonal shaft reduction gear casing 14 (a radial direction of the output shaft 54) by a dimension L1. The flange portion 14A has an outer periphery having the same center as the shaft center O2 of the output shaft 54 of the orthogonal shaft reduction gear R (FIGS. 3 and 4). In this embodiment, a diameter is d14A. Since the flange portion 14A protrudes radially outward from the orthogonal shaft reduction gear casing 14 by the dimension L1, it is possible to connect the orthogonal shaft reduction gear casing 14 to the joint plate 17 through a first bolt 71 inserted from the orthogonal shaft reduction gear R side.

Further, the orthogonal shaft reduction gear casing 14 has an outer peripheral connection portion 14Q which is connected to the joint plate 17 along with the flange portion 14A. The outer peripheral connection portion 14Q is configured by planarizing a portion of the outer periphery of a bearing accommodation portion 14B which accommodates the pair of tapered roller bearings 62 and 63 supporting the input shaft (the orthogonal pinion shaft) 52. Specifically, the outer peripheral connection portion 14Q is configured by planarizing only a portion (axial length L2) facing a second plate portion (a connection portion) 17B (described later) of the joint plate 17, of a cylindrical outer periphery of the bearing accommodation portion 14B.

In this embodiment, an end surface 14P on the joint plate 17 side in an axial direction of the flange portion 14A and the outer peripheral connection portion 14Q are formed flush and in a continuous plane surface. However, the end surface 14P of the flange portion 14A and the outer peripheral connection portion 14Q may not be flush and, for example, a step may be present therein. Further, in short, it is sufficient if the outer peripheral connection portion 14Q has a shape which can be connected to the second plate portion 17B of the joint plate 17, and the outer peripheral connection portion 14Q may not be configured necessarily in a plane surface. This will be mentioned later.

A position where the outer peripheral connection portion 14Q is formed in the axial direction of the input shaft 52 of the orthogonal shaft reduction gear R, that is, a "position overlapping with the tapered roller bearings 62 and 63 supporting the input shaft 52 when viewed from the radial direction (of the input shaft 52)" can also be regarded as, in other words, a "position where there is a possibility that due to the presence of the tapered roller bearings 62 and 63 and the input shaft 52, it may become difficult to insert the first bolt 71 into the flange portion 14A from the orthogonal shaft reduction gear R side when connecting the orthogonal shaft reduction gear casing 14 to the joint plate 17".

On the other hand, the joint plate 17 connecting the orthogonal shaft reduction gear casing 14 and the parallel shaft reduction gear casing 16 is provided with a first plate portion 17A and the second plate portion (the connection portion) 17B. The first plate portion 17A faces the flange portion 14A of the orthogonal shaft reduction gear casing 14. The second plate portion 17B faces the outer peripheral connection portion 14Q of the bearing accommodation portion 14B of the orthogonal shaft reduction gear casing 14. That is, the second plate portion 17B faces the outer peripheral connection portion 14Q by protruding in the radial direction from the first plate portion 17A in a planar shape (only in a portion in a circumferential direction) by L2 at a position overlapping with the tapered roller bearings 62 and 63 supporting the input shaft 52 when viewed from the radial direction (the radial direction of the input shaft 52). The orthogonal shaft reduction gear casing 14 and the joint plate 17 are connected by a plurality of (in the example shown in the drawings, seven) first bolts 71 inserted into the flange portion 14A of the orthogonal shaft reduction gear casing 14 from the orthogonal shaft reduction gear R side, and a plurality of (in the example shown in the drawings, two) second bolts 72 inserted into the second plate portion 17B of the joint plate 17 from the parallel shaft reduction gear P side. Specifically, the flange portion 14A of the orthogonal shaft reduction gear casing 14 and the first plate portion 17A of the joint plate 17 are connected by the first bolts 71. Further, the outer peripheral connection portion 14Q formed at the bearing accommodation portion 14B of the orthogonal shaft reduction gear casing 14 and the second plate portion (the connection portion) 17B of the joint plate 17 are connected by the second bolts 72. In addition, in this embodiment, the second bolt 72 is disposed at a position equidistant from the pair of tapered roller bearings 62 and 63.

In addition, the ball bearing 68 is provided radially inside the joint plate 17 and supports the output shaft 54 of the orthogonal shaft reduction gear R and also indirectly rotatably supports the input shaft 40 of the parallel shaft reduction gear P press-fitted into and connected to the hollow portion 54A of the output shaft 54. That is, the joint plate 17 doubles as a cover of the orthogonal shaft reduction gear casing 14 and also doubles as a cover of the parallel shaft reduction gear casing 16.

The parallel shaft reduction gear casing 16 of the parallel shaft reduction gear P is provided with an axial end surface 16B facing the first plate portion 17A of the joint plate 17. The parallel shaft reduction gear casing 16 is fitted into a protrusion portion 17P formed at the joint plate 17 in a spigot joint manner, and is connected to the joint plate 17 by a plurality of (in the example shown in the drawings, eight) third bolts 73 inserted from the orthogonal shaft reduction gear R side. As shown in FIG. 4, in this embodiment, the third bolt 73 is disposed at the position of the center in the circumferential direction between the first bolts 71 on the same circumference as the circumference of the first bolts 71.

In addition, a concave portion 17C accommodating a head portion 73A of each third bolt 73 is formed in the joint plate 17. The concave portion 17C is blocked by an axial end surface on the joint plate 17 side of the orthogonal shaft reduction gear casing 14 (in this example, by the axial end surface 14P of the flange portion 14A). That is, the head portion 73A of the third bolt 73 is completely accommodated in the concave portion 17C of the joint plate 17 and does not interfere with connection of the joint plate 17 and the orthogonal shaft reduction gear casing 14.

In addition, describing a power transmission system, the output shaft 54 of the orthogonal shaft reduction gear R has the hollow portion 54A at the leading end thereof. The input shaft 40 of the parallel shaft reduction gear P is press-fitted into the hollow portion 54A, thereby being connected to the output shaft 54.

In this embodiment, the parallel shaft reduction gear P has an in-line type simple planetary gear speed reduction mechanism 45. The simple planetary gear speed reduction mechanism 45 is provided with a sun gear 30 integrated with the input shaft 40, a planetary gear 32 circumscribing the sun gear 30, and an internal gear 34 in which the planetary gear 32 is inscribed. The planetary gear 32 is supported at both sides on carriers 37 and 38 disposed on both sides in the axial direction of the planetary gear 32 through a planetary pin 35. The carriers 37 and 38 are connected through a carrier pin 36 and supported on the parallel shaft reduction gear casing 16 through bearings 41 and 42. A configuration is made such that the rotation of the output shaft 54 of the orthogonal shaft reduction gear R is output from the carrier 38.

In addition, reference numerals 82, 86, and 87 in FIG. 1 denote oil seals, reference numeral 88 denotes an O-ring, and the oil seals and the O-ring seal the inside of the reduction gear G.

Next, an operation of the reduction gear G will be described.

If the motor shaft 20 of the motor M rotates, the rotation is transmitted to the input shaft 52 of the orthogonal shaft reduction gear R of the reduction gear G through the joint shaft 22. The bevel pinion 56 is formed at the leading end of the input shaft 52 of the orthogonal shaft reduction gear R, and the bevel pinion 56 is engaged with the bevel gear 58 provided at the output shaft 54 of the orthogonal shaft reduction gear R. As a result, speed reduction equivalent to the gear ratio between the bevel pinion 56 and the bevel gear 58 is made and a rotation direction is changed at a right angle. In addition, thrust load which is generated in the input shaft 52 due to the engagement of the bevel pinion 56 with the bevel gear 58 is taken by the orthogonal shaft reduction gear casing 14 through the pair of tapered roller bearings 62 and 63. On the other hand, thrust load which is generated in the output shaft 54 is taken by the orthogonal shaft reduction gear casing 14 and the joint plate 17 through the pair of ball bearings 66 and 68.

The output shaft 54 of the orthogonal shaft reduction gear R is connected to the input shaft 40 of the parallel shaft reduction gear P. For this reason, the input shaft 40 of the parallel shaft reduction gear P is rotated by the rotation of the output shaft 54 of the orthogonal shaft reduction gear R and the sun gear 30 integrated with the input shaft 40 is rotated. After speed reduction is performed in the simple planetary gear speed reduction mechanism 45 by the rotation of the sun gear 30, the output of the reduction gear G is extracted from the carrier 38.

Here, the orthogonal shaft reduction gear R of the reduction gear G is provided with the tapered roller bearings 62 and 63 supporting the input shaft (the orthogonal pinion shaft) 52 of the orthogonal shaft reduction gear casing 14 and the orthogonal shaft reduction gear casing 14 and the parallel shaft reduction gear casing 16 are connected through the joint plate 17.

The orthogonal shaft reduction gear casing 14 has the flange portion 14A protruding to the outside of the orthogonal shaft reduction gear casing 14, and the outer peripheral connection portion 14Q formed at the bearing accommodation portion 14B accommodating the tapered roller bearings 62 and 63. Further, the joint plate 17 has the first plate portion 17A facing the flange portion 14A, and the second plate portion 17B facing the outer peripheral connection portion 14Q. Then, the orthogonal shaft reduction gear casing 14 and the joint plate 17 are connected by the first bolts 71 inserted into the flange portion 14A from the orthogonal shaft reduction gear R side, and the second bolts 72 inserted into the joint plate 17 from the parallel shaft reduction gear P side.

Describing more specifically, in the reduction gear G, in a case of connecting the orthogonal shaft reduction gear R and the parallel shaft reduction gear P, first, the parallel shaft reduction gear casing 16 and the joint plate 17 are connected through the third bolts 73. The third bolt 73 is inserted into the joint plate 17 from the orthogonal shaft reduction gear R side. Therefore, connection work by the third bolt 73 can be performed from the outside of the parallel shaft reduction gear casing 16.

Next, the orthogonal shaft reduction gear casing 14 of the orthogonal shaft reduction gear R and the joint plate 17 are connected by the first bolts 71 inserted into the flange portion 14A from the orthogonal shaft reduction gear R side. However, one (the first bolt 71 to be disposed at a site indicated by reference numeral 71A in FIG. 4) of the first bolts 71 cannot be disposed due to interference with the input shaft 52 of the orthogonal shaft reduction gear R or the tapered roller bearings 62 and 63 supporting the input shaft 52. However, the site is an important site where the orthogonal shaft reduction gear casing 14 and the parallel shaft reduction gear casing 16 are connected through the joint plate 17. That is, if the first bolt 71 is not disposed at the site indicated by reference numeral 71A, specifically, rotary torque and moment load which are generated in the orthogonal shaft reduction gear R cannot be fully supported, and thus there is a possibility that sealing properties of matching surfaces may be impaired.

Therefore, in this embodiment, the orthogonal shaft reduction gear casing 14 and the joint plate 17 are connected by the first bolts 71 inserted into the flange portion 14A from the orthogonal shaft reduction gear R side and also connected by the second bolts 72 inserted into the joint plate 17 from the parallel shaft reduction gear P side. Since the joint plate 17 has the second plate portion 17B protruding from the first plate portion 17A, it is possible to insert the second bolts 72 into the second plate portion 17B from the parallel shaft reduction gear P side (instead of the first bolt 71 to be disposed at the site indicated by reference numeral 71A). The second plate portion 17B of the joint plate 17 and the outer peripheral connection portion 14Q of the orthogonal shaft reduction gear casing 14 are connected by the second bolts 72. As a result, in the end, all bolt fastening works can be performed outside the parallel shaft reduction gear casing 16 and the orthogonal shaft reduction gear casing 14.

Further, even at a site where it is not possible to insert the first bolt 71 due to the second bolt 72 inserted into the outer peripheral connection portion 14Q of the bearing accommodation portion 14B (the site indicated by reference numeral 71A, which interferes with the tapered roller bearings 62 and 63 and the input shaft 52), it is possible to dispose the second bolt 72 instead of the first bolt 71, and thus it is possible to maintain high connection strength. In particular, in this embodiment, since the second bolt 72 is disposed at a position equidistant from the pair of tapered roller bearings 62 and 63 supporting the input shaft 52, stronger connection is possible.

In addition, in the embodiment described above, the outer peripheral connection portion 14Q of the orthogonal shaft reduction gear casing 14 and the second plate portion (the connection portion) 17B of the joint plate 17 are configured in a "plane surface" and only the vicinity of the site indicated by reference numeral 71A is connected by the second bolts 72. However, the shape, a formation position, or a formation range of the outer peripheral connection portion 14Q or the second plate portion 17B is not particularly limited, in short, as long as it is a configuration in which the orthogonal shaft reduction gear casing and the joint plate can be connected by the second bolts inserted into the joint plate from the parallel shaft reduction gear side. For example, the outer peripheral connection portion of the orthogonal shaft reduction gear casing may be configured to have a cylindrical outer periphery, that is, in a "curved surface", rather than a "plane surface". In this case, it is sufficient if the second plate portion of the joint plate is formed in a shape having a facing curved surface of a concave shape following the "curved surface" of the cylindrical outer periphery. In this way, it is possible to make the outer peripheral connection portion and the second plate portion face each other in a wider range, and thus it is possible to connect the orthogonal shaft reduction gear casing and the joint plate by using a larger number of second bolts. That is, in this case, with respect to the first bolt, it is possible to secure a predetermined number in the flange portion, and therefore, in the end, it becomes possible to perform stronger connection by an amount corresponding to an increase in the number of second bolts.

Furthermore, the joint plate 17 need also not necessarily overlap with the tapered roller bearings 62 and 63 in the radial direction. That is, for example, the bearing supporting the orthogonal pinion shaft may be shifted further to the motor side than the joint plate. Even in this case, a problem in that due to the presence of the orthogonal pinion shaft, it is still difficult to dispose the first bolt at the site indicated by reference numeral 71A can occur, and therefore, by adopting the same configuration as the above, it is possible to obtain the same operation and effect.

In short, the orthogonal shaft reduction gear casing and the joint plate need only have shapes in which the orthogonal shaft reduction gear casing and the joint plate can be connected by the first bolts inserted into the flange portion from the orthogonal shaft reduction gear side and can be connected by the second bolts inserted into the joint plate from the parallel shaft reduction gear side.

Further, in the embodiment described above, a configuration is made such that the first bolts 71 and the third bolts 73 are alternately disposed on the same circumference. However, the first bolts and the third bolts need not necessarily be on the same circumference (pitch circles may be slightly shifted from each other).

Further, in the embodiment described above, as an orthogonal pinion of the orthogonal shaft reduction gear, the bevel pinion is adopted. However, certain embodiments of the present invention are not limited thereto, and, for example, a hypoid pinion or a worm pinion is also likewise applicable and the same operation and effect is obtained.

In addition, in the embodiment described above, as the parallel shaft reduction gear, the reduction gear having the simple planetary gear speed reduction mechanism is adopted. However, certain embodiments of the present invention are not limited thereto, and, for example, a reduction gear having a spur gear or helical gear speed reduction mechanism, or a reduction gear having an eccentric oscillation type planetary gear speed reduction mechanism in which an external gear is inscribed in an internal gear while oscillating is also acceptable. In short, it is enough if the parallel shaft reduction gear related to certain embodiments of the present invention is a "reduction gear in which an input shaft and an output shaft are disposed in parallel (including the same axis)".

It should be understood that the invention is not limited to the above-described embodiment, but may be modified into various forms on the basis of the spirit of the invention. Additionally, the modifications are included in the scope of the invention.

What is claimed is:

1. A reduction gear system comprising:
   an orthogonal shaft reduction gear assembly;
   a parallel shaft reduction gear assembly; and
   a joint plate disposed between the orthogonal shaft reduction gear assembly and the parallel shaft reduction gear assembly, along an axial direction of an output shaft of the orthogonal shaft reduction gear assembly,
   wherein the orthogonal shaft reduction gear assembly includes an orthogonal shaft reduction gear casing, a first input shaft, a bevel pinion disposed on the first input shaft, a bevel gear configured to engage with the bevel pinion, and the output shaft on which the bevel gear is disposed,
   the parallel shaft reduction gear assembly includes a parallel shaft reduction gear casing, a second input shaft to which a rotation of the output shaft is transmitted, and a parallel shaft gear which is driven by the second input shaft,
   the orthogonal shaft reduction gear casing and the parallel shaft reduction gear casing are connected through the joint plate,
   the orthogonal shaft reduction gear casing has a flange portion protruding to the outside of the orthogonal shaft reduction gear casing, and
   the orthogonal shaft reduction gear casing and the joint plate are connected by a first bolt inserted into the flange portion from the orthogonal shaft reduction gear assembly side, and a second bolt inserted into the joint plate from the parallel shaft reduction gear assembly side.

2. The reduction gear system according to claim 1, wherein the orthogonal shaft reduction gear assembly is provided with a first bearing supporting the first input shaft on the orthogonal shaft reduction gear casing,
   the joint plate has a connection portion which is disposed at a position overlapping with the first bearing when viewed from a radial direction of the first input shaft, and
   the second bolt is inserted into the connection portion.

3. The reduction gear system according to claim 2, wherein the first bearing is configured with a pair of bearings, and the second bolt is disposed at a position equidistant from the pair of bearings.

4. The reduction gear system according to claim 2, wherein
   the orthogonal shaft reduction gear casing includes a bearing accommodation portion configured to accommodate the first bearing, and an outer periphery of the bearing accommodation portion has a cylindrical shape, and includes a planarized portion facing a connection portion of the joint plate.

5. The reduction gear system according to claim 4, wherein the planarized portion is flush with an end surface of the flange portion on the joint plate side in the axial direction.

6. The reduction gear system according to claim 1, wherein the joint plate and the parallel shaft reduction gear casing are connected by a third bolt inserted into the joint plate from the orthogonal shaft reduction gear assembly side.

7. The reduction gear system according to claim 6, wherein a concave portion accommodating a head portion of the third bolt is provided in the joint plate, and the concave portion is blocked by the orthogonal shaft reduction gear casing.

8. The reduction gear system according to claim 6, further comprising a fourth bolt inserted into the flange portion from the orthogonal shaft reduction gear assembly side, wherein the third bolt is disposed between the first bolt and the fourth bolt in a circumferential direction.

9. The reduction gear system according to claim 1, further comprising a motor, a joint casing disposed between the motor and the orthogonal shaft reduction gear assembly, a joint shaft which connects a motor shaft of the motor and the first input shaft, and a second bearing configured to support the joint shaft on the joint casing.

10. The reduction gear system according to claim 1, further comprising a third bearing which supports the output shaft on the orthogonal shaft reduction gear casing, and a fourth bearing which supports the output shaft on the joint plate.

11. The reduction gear system according to claim 1, wherein
the first bolt is inserted in a first direction, the first direction being parallel or antiparallel to the axial direction, and
the second bolt is inserted in a second direction, the second direction being opposite to the first direction.

* * * * *